United States Patent
Bader

(10) Patent No.: US 8,605,594 B2
(45) Date of Patent: Dec. 10, 2013

(54) METHOD AND ARRANGEMENTS FOR DYNAMIC RESOURCE RESERVATION

(75) Inventor: Attila Bader, Paty (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 202 days.

(21) Appl. No.: 13/320,791

(22) PCT Filed: May 18, 2009

(86) PCT No.: PCT/SE2009/050549
§ 371 (c)(1),
(2), (4) Date: Nov. 16, 2011

(87) PCT Pub. No.: WO2010/134856
PCT Pub. Date: Nov. 25, 2010

(65) Prior Publication Data
US 2012/0057461 A1    Mar. 8, 2012

(51) Int. Cl.
*H04L 12/26* (2006.01)
(52) U.S. Cl.
USPC .......................................... 370/235; 370/477

(58) Field of Classification Search
USPC ................... 370/235, 236, 252, 468, 477, 522
See application file for complete search history.

(56) References Cited

U.S. PATENT DOCUMENTS

| | | | |
|---|---|---|---|
| 2006/0215599 A1* | 9/2006 | Nakatugawa et al. | 370/328 |
| 2008/0137625 A1* | 6/2008 | Hori et al. | 370/338 |
| 2009/0172170 A1 | 7/2009 | Rey | |
| 2009/0190551 A1* | 7/2009 | Hori et al. | 370/331 |
| 2010/0135289 A1* | 6/2010 | Bowes | 370/389 |
| 2010/0157939 A1* | 6/2010 | Ue et al. | 370/331 |
| 2010/0246417 A1* | 9/2010 | Cheng et al. | 370/252 |

\* cited by examiner

Primary Examiner — Brian D Nguyen

(57) ABSTRACT

Embodiments of the present invention relate to network nodes and methods that allow for improved QoS control in a telecommunications network by providing combined reservation of transport resources and processing resources for a traffic flow. The amount of transport resources and the amount of processing resources required in connection with a traffic flow can be signaled in a signaling message from a sender node to a receiver node to enable reservation of appropriate amounts of processing resources as well as transport resources.

24 Claims, 6 Drawing Sheets

METHOD AND ARRANGEMENTS FOR DYNAMIC RESOURCE RESERVATION

TECHNICAL FIELD

The present invention relates to methods and arrangements for dynamic resource reservation in a telecommunications network.

BACKGROUND

Resource reservation methods in IP/Ethernet transport networks are increasingly important because carrier grade transport networks require methods for guaranteed services, i.e. services that provide a certain guaranteed quality of service (QoS). IP (Internet Protocol) transport is currently being introduced in mobile access networks, such as WCDMA RAN (Wideband Code Division Multiple Access Radio Access Network) and LTE (Long Term Evolution) networks. In such access networks user and signaling traffic often share limited transport resources. Therefore resource reservation of these transport resources is required. In order to provide dynamic resource reservation, signaling protocols are used.

There are several different methods for QoS control, such as IntServ (Integrated services) and DiffServ (Differentiated Services).

The idea of IntServ is to implement it in every router and every application that requires using transport resources in a router should make an individual reservation. The Internet Engineering Task Force (IETF) standardization organization has specified a signaling protocol called RSVP (Resource ReSerVation Protocol) for making transport resource reservation in IP routers. RSVP can be used to provide IntServ for real-time and non real-time traffic in the Internet. RSVP signaling messages reserve transport resources in each router along a data path before sending a real-time traffic flow. Real-time flows are admitted into the network if transport resources are successfully reserved in each router along the data path.

The IntServ method requires storing per-flow reservation states in each router along the data path. Storing and maintaining per-flow states in each router can be a problem in large networks, where the number of flows and therefore the number of reservation states is high. After recognizing this scalability problem of RSVP and IntServ, the IETF specified an RSVP aggregation method, which allows making reservations for aggregated flows. Aggregated reservation states are not necessarily created, modified or refreshed for each flow request.

The Diff Serv method for QoS control can be used to provide QoS in large-scale networks. In a DiffServ architecture scalability is achieved by offering services on an aggregate rather than per-flow basis and by forcing as much of the per-flow state as possible to the edges of the network. Service differentiation is achieved by using a Differentiated Services (DS) field in the header of IP packets. The IP packets are classified into Per-Hop Behavior (PHB) groups at DiffServ edge nodes. The applicable PHB of an IP-packet is indicated in the DS field of the IP header. The packets are handled in DiffServ routers according to the PHB indicated by the DS field. DiffServ is a scalable QoS method but it does not provide a QoS guaranteed service, therefore it requires higher bandwidths than signaling reservation methods such as IntServ.

The IETF Next Steps In Signaling (NSIS) Working Group is working on a protocol called NSIS (Next Steps in Signaling) to meet the new signaling requirements of today's IP networks, see RFC 3726 "Requirements for Signaling Protocols" by M. Brunner, published April 2004. The NSIS protocol consists of a transport layer and a QoS signaling application layer, which define a basic signaling mechanism. The QoS signaling application protocol of NSIS is called NSLP (NSIS signaling layer protocol). NSLP is fundamentally similar to RSVP but it has several new features, such as supporting different QoS Models.

One QoS model that can be implemented in NSIS is the IntServ model. Another QoS models under specification is Resource Management in Diffserv (RMD). RMD defines scalable admission control methods for Diffserv networks. It also includes a severe congestion function that is able to terminate the required number of packet flows in order to maintain the required QoS for the rest of the flows, in case of severe congestion situations, which may occur due to e.g. link or node failure. This congestion function is described in the international patent application WO2006/052174 A1, published on May 18, 2006.

The above described methods for QoS control relate to control of the use of transport resources. These methods are useful when transport resources are the scarce resources that limit the QoS that can be provided. However in case of other QoS limiting factors than transport resources, the prior art methods fail to provide adequate QoS control.

SUMMARY

An object of the present invention is to provide methods and arrangements for QoS control that facilitate providing a guaranteed service in cases where availability of transport resources is not the only QoS limiting factor.

The above stated object is achieved by means of methods and nodes according to the independent claims.

A first embodiment of the present invention provides a method in a node of a telecommunications network. The method is used for dynamic reservation of resources for a traffic flow. The method comprises a step of creating a signaling message. The signaling message includes resource reservation information related to the traffic flow for which dynamic reservation of resources is to be carried out. The resource reservation information includes an indication of the amount of transport resources required for transportation of the traffic flow within the telecommunications network. The resource reservation information also includes an indication of the amount of processing resources required for processing traffic payload of the traffic flow. These indications of required resources are included in the signaling message to enable resource reservation of traffic resources and processing resources for the traffic flow. The method also comprises a step of sending the created signaling message to another node.

A second embodiment of the present invention provides a method in a node of a telecommunications network. The method is used for dynamic reservation of resources for a traffic flow. The method comprises a step of receiving a signaling message including a resource reservation request related to the traffic flow. The resource reservation request in the received signaling message includes an indication of the amount of transport resources required for transportation of the traffic flow within the telecommunications network. The resource reservation request also includes an indication of the amount of processing resources required for processing traffic payload of the traffic flow. The method also comprises a step of interpreting the indication of the amount of required processing resources. In a further step of the method resources in accordance with the received request are reserved if such resources are available.

A third embodiment of the present invention provides a network node for use in a telecommunications network. The network node is adapted for dynamic reservation of resources for a traffic flow. The network node comprises a processing unit that is adapted to create a signaling message, which includes resource reservation information related to the traffic flow. The resource reservation information includes an indication of the amount of transport resources required for transportation of the traffic flow within the telecommunications network. The resource reservation information also includes an indication of the amount of processing resources required for processing traffic payload of the traffic flow. These indications of required resources are included in the signaling message to enable resource reservation of traffic resources and processing resources for the traffic flow. The network node further comprises an output unit that is adapted to send the signaling message to another network node.

A fourth embodiment of the present invention provides a network node for use in a telecommunications network. The network node is adapted for dynamic reservation of resources for a traffic flow. The network node comprises an input unit that is adapted to receive a signaling message including a resource reservation request related to the traffic flow. The resource reservation request in the received signaling message includes an indication of the amount of transport resources required for transportation of the traffic flow within the telecommunications network. The resource reservation request also includes an indication of the amount of processing resources required for processing traffic payload. The network node further comprises reservable processing resources that are adapted to process the traffic payload of the traffic flow and a reservation unit. The reservation unit is adapted to interpret the resource reservation request and to reserve resources in accordance with the received request if such resources are available.

An advantage of embodiments of the present invention is that QoS guarantees for processing payload of a traffic flow can be provided, as well as for transport of the traffic flow. Embodiments of the present invention may be used to ensure stable operation for OSS performance management functions, for example performance monitoring, trouble shooting and optimization features. Operators can use optional features more intensively because they can be sure that it will not influence the normal network operations. Embodiments of the present invention may also be used to guarantee end-to-end transport QoS for data flows, which include QoS of transcoding operations. It can be especially useful when a media gateway needs to serve different types of data flows, having various processing requirements.

Another advantage of embodiments of the present invention is that no separate messages are needed to control processing. The same signaling message may be used for reserving transport resources as well as processing resources for a traffic flow.

Yet another advantage of embodiments of the present invention is that signaling feedback may be given of any processing problems and an appropriate action can then be taken before sending a traffic flow. If reservation of processing resources is unsuccessful, transport resources are not reserved and data are not sent unnecessarily.

Further advantages and features of embodiments of the present invention will become apparent when reading the following detailed description in conjunction with the drawings.

DETAILED DESCRIPTION

Figure 1:
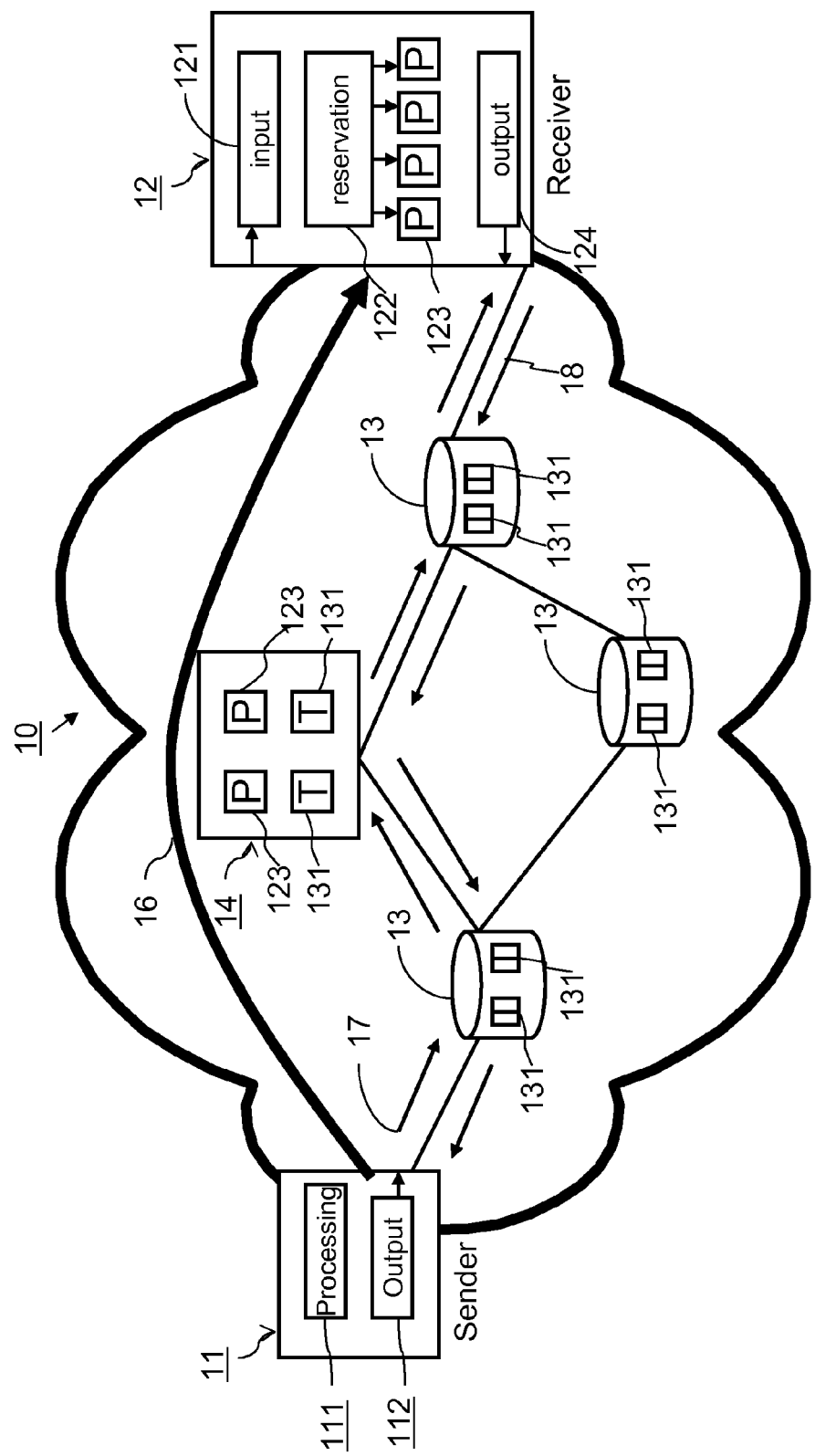
FIG. 1 is a schematic block diagram illustrating a telecommunications network in which methods and devices according to the present invention are implemented.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

All of the prior art methods for QoS control that have been discussed above relate to controlling the use of transport resources. The use of transport resources can be controlled e.g. by means of reserving bandwidth and forwarding resources. These prior art methods may be able to achieve an adequate QoS control in cases where the availability of transport resources is the QoS limiting factor. However this is not always the case. In some cases the desired level of QoS cannot be reached despite the fact that there is a sufficient amount of transport capacity (bandwidth and forwarding capacity) in a network. Such a situation implies that the QoS limiting factor is something other than the availability of transport resources. It may however be difficult to identify the source of an experienced QoS degradation.

In case of some signaling applications, and media applications, the processing of the payload has been found to be the limiting factor of QoS. Thus the availability of processing resources is often equally important for providing QoS as the availability of transport resources. Embodiments of the present invention provide methods and arrangements by means of which dynamic reservation of processing resources as well as transport resources can be achieved. In these embodiments processing resources and transport resources may be reserved by using a common signaling message which includes an indication of required processing resources and an indication of required transport resources, as will be explained in greater detail below.

An example of an area of application in which the methods and arrangements according to embodiments of the present invention may be particularly beneficial is in connection with functions of a network management system. Network management systems currently do not use resource reservation. In large scale networks operating support systems (OSS) and network management systems (NMS) can generate significant load to the network. When operation and maintenance (OAM) traffic and user traffic share the same transport resources, they can influence each other. Degradation of OSS and NMS traffic can have a significant effect on network operation. Performance management (PM) functions, such as performance monitoring, trouble shooting and optimization functions, of an OSS node involve collection and processing of large amounts of performance data and statistics from different network nodes. These PM functions need a large amount of transport and processing resources and if it is not available, it can lead to unstable operation.

Another example of an area of application in which the methods and arrangements according to embodiments of the present invention may be particularly beneficial is in connection with transcoding operations which require relatively high processing capacity because complete decoding and encoding of a traffic flow is needed.

Embodiments of the present invention will now be explained with reference to a number of different application scenarios. FIG. 1 is a schematic block diagram of a fairly general application scenario. In FIG. 1 a telecommunications network 10 is schematically illustrated. The network 10 is here assumed to be an IP (internet protocol) network. The network 10 comprises a number of network nodes 11, 12, 13 and 14. Only a few network nodes are illustrated in FIG. 1 in order to simplify the explanation of the invention although it is to be understood that the network 10 is likely to include a large number of network nodes in reality. From one point of view used for explaining the embodiments of the present invention, the network nodes have transporting and/or processing functionality provided by schematically illustrated processing resources 123 and transport resources 131 respectively. By transporting functionality is herein meant functionality related to forwarding of traffic (i.e. IP packets in this case), while processing functionality refers to processing of traffic payload (i.e. IP packet payload in this case). Network nodes having transport functionality are herein referred to as transport nodes while network nodes having processing functionality are referred to as processing nodes. There can also be nodes that have both transport and processing functionalities. In FIG. 1 the network nodes 13 are transport nodes, the network node 12 is illustrated as a processing node while the network node 14 is a combined transport and processing node. The main role of transport nodes is to forward the packets and provide transport QoS. The main role of processing nodes is to process the payload of the packets and provide QoS for the processing of the payload.

In FIG. 1 the network node 11 is a sender node of a traffic flow 16 that is terminated in node 12, which thus is a receiver node. The traffic flow requires transport resources for transportation of the traffic flow through the network 10 and it also requires processing resources for processing its traffic payload. These required transport and processing resources may be reserved prior to sending the traffic flow according to embodiments of the present invention. For this purpose the sender node 11 is adapted to create a signaling message 17 including resource reservation information related to the traffic flow 16. The resource information includes an indication of the amount of required transport resources as well as an indication of the amount of required processing resources. This signaling message is forwarded in the network to appropriate network nodes to be involved in the transportation and processing of the network nodes so that these nodes can reserve the transport resources and/or processing resources that are required in the respective nodes.

Existing signaling protocols that previously have been used for reservation of transport resources may be used (possibly with some modification) for reservation of processing resources and transport resources according to different embodiments of the present invention. It is for instance possible to use NSIS (Next Steps in Signaling) signaling for the process and transport resource reservation, but other types of reservation signaling can also be used such as RSVP (Resource ReSerVation Protocol).

Embodiments using NSIS signaling will now be explained in greater detail. NSIS supports both sender and receiver initiated transport resource reservation. The main difference between them is that in sender initiated method the sender node initiates a transport resource reservation request, while in the case of receiver initiated transport resource reservation the receiver node decides about the transport resource reservation request. Both the sender and receiver initiated signaling that has been used for transport resource reservation can be modified for reservation of processing and transport resource reservation.

Figure 2:
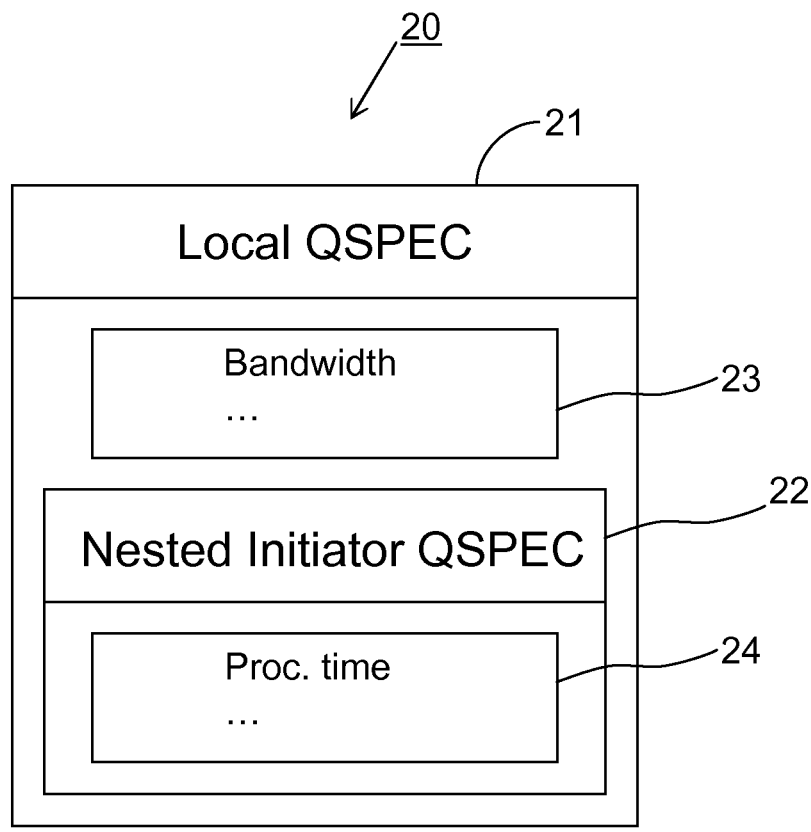
FIG. 2 is a schematic block diagram illustrating a format of a QSPEC object according to an embodiment of the present invention.

NSLP (NSIS signaling layer protocol), which is the QoS signaling application protocol of NSIS makes it possible to use two nested QoS models: one is called Initiator QoS model and the other one is called Local QoS model. NSLP specifies a QSPEC object which is the object of a NSLP message containing all QoS-specific information. The QSPEC object can include a Local QSPEC describing the Local QoS model and a nested Initiator QSPEC describing the Initiator QoS model. This can be used as a template for creating a new QoS Model wherein the transport resource reservation is performed using the Local QoS model described by the Local QSPEC, and the processing resource reservation is performed using the Initiator QoS model described by the Initiator QSPEC. FIG. 2 is an schematic block diagram of the format of a QSPEC object 20 of this QoS model.

The QSPEC object 20 includes a Local QSPEC 21 and a nested Initiator QSPEC 22. The Local QSPEC 21 includes an indication 23 of the amount transport resources that is required for transportation of an associated traffic flow. The Initiator QSPEC 22 includes an indication 24 of the amount processing resources that is required for processing payload of the associated traffic flow. The transport resource indication 23 may be a QoS descriptor that can include one or several transport resource related parameters that may be linked to specific transport reservation methods such as e.g. IntServ or RMD. In RMD a single 32 bit bandwidth parameter is used for reservation by default. But the QoS descriptor can include additional parameters, or can be a more complex descriptor, like token bucket, or multiple token buckets, which is used by IntServ. The processing resource indication 24 may include processing resource related parameters. There are several different exemplary alternatives:

The processing resource indication 24 consists of a single parameter describing the processing time explicitly e.g. a 32 bit field which can contain a value representing the required processing time in micro seconds, as it is illustrated in FIG. 2.

The processing resource indication 24 comprises one or several parameters that describe the required amount of processing resources in an implicit way. Suitable parameters will depend on the area of application. If the traffic flow relate to a PM function for example, suitable parameters may be PM data type (possible values: STATS, UETR, GPEH, CTR) and number of counters per counter types (e.g. STATS counter types: Accumulator, Gauge, Peg, PDF, Scan, TrigACC, or TrigSCAN) which can be used to characterize the complexity of the payload and thus provide an indication of the required amount of processing resources. If the traffic flow includes payload that needs to be transcoded, suitable parameters may be transcoding type (e.g. AMR to PCN, MPEG2 to MPEG4) and bitrate of the transcoded traffic (kbps) which can provide an indication of the required amount of processing resources for transcoding the payload.

The processing resource indication 24 may include an indication that the required amount of processing resources should be measured in a processing node. This could be of interest if the required amount of processing resources is not known and it is of interest to learn what this amount is for future reservations. If the processing time is indicated as unknown in the processing resource indication 24 this can trigger the processing node to measure the required processing time of a given session (traffic flow). This measurement can be signaled back to the sender node and reused in a later reservation.

The Initiator QSPEC 22 is processed only in the processing nodes, while Local QSPEC is processed in each NSIS node. Thus implementation of the new QoS model will not require any modification of transport nodes that are already adapted for NSIS.

Figure 6:
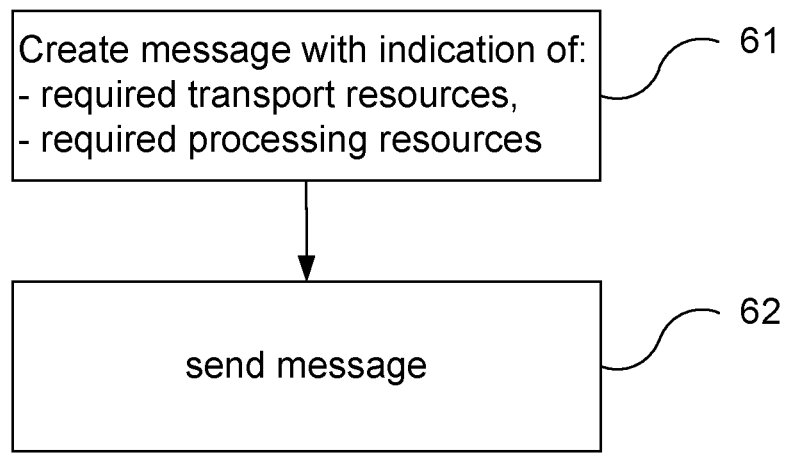
FIG. 6 is a flow chart illustrating an embodiment of the present invention, which is a method in a node that sends a signaling message to indicate required resources for a traffic flow.
Figure 7:
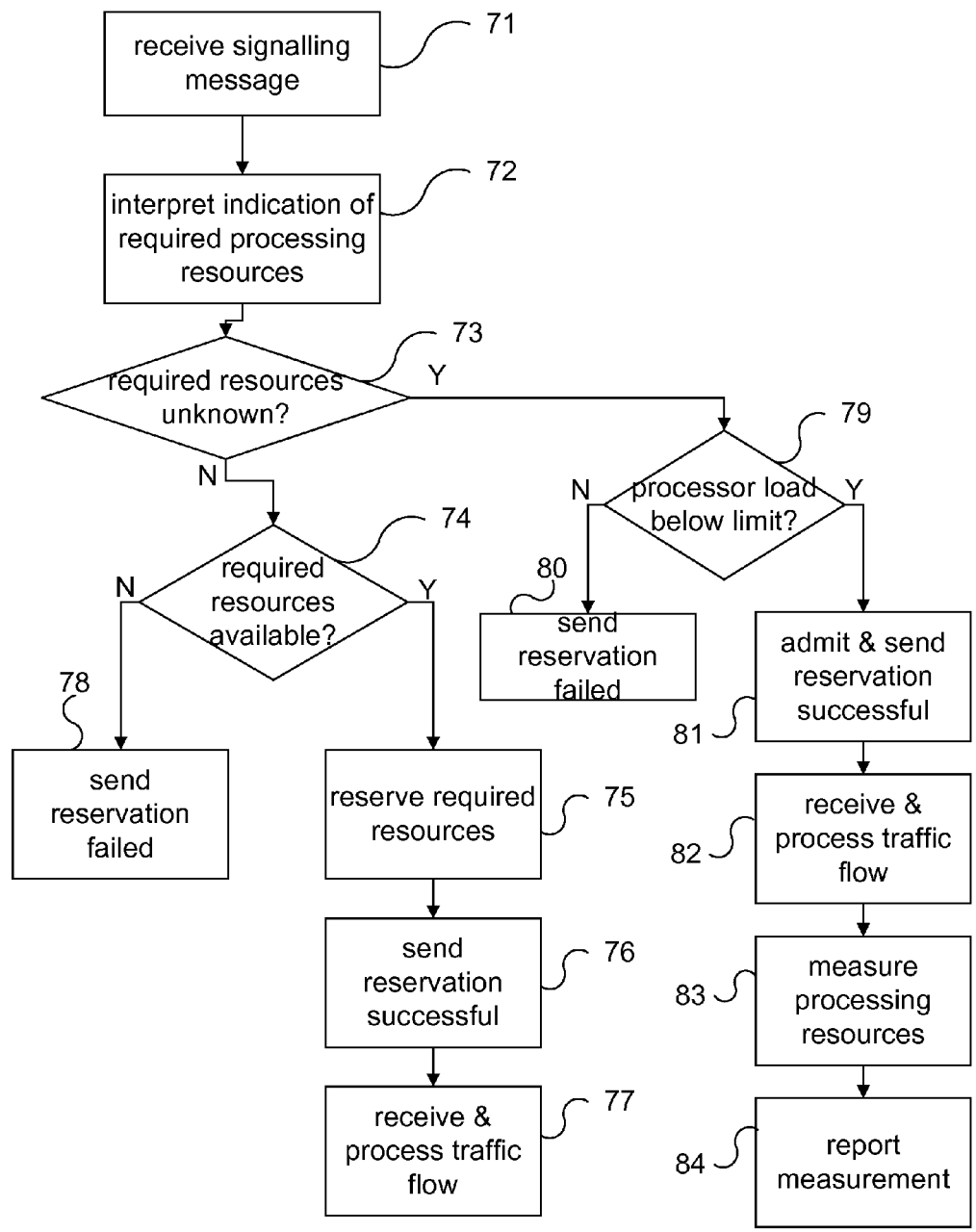
FIG. 7 is a flow chart illustrating an embodiment of the present invention, which is a method in a network node that receives a signaling message to indicating required resources for a traffic flow.

Embodiments of methods according to the present invention will now be explained in connection with FIG. 6 and FIG. 7. FIG. 6 is a flow diagram of a method in a node that sends the signaling message 17 to request reservation of processing and transport resources. FIG. 7 is a flow diagram of a method in a processing node that receives a request for reservation of processing resources.

Referring to FIG. 6 when a sender node wants to reserve processing and transport resources for the a traffic flow or a group of flows, it creates a signaling message 17 that includes an indication of the transport resources required for transporting the flow(s) and an indication of the processing resources required for processing the payload of the flow(s), step 61. The signaling message may be a RESERVE message according to the NSLP protocol with a QSPEC object 20 as described above with reference to FIG. 2. The signaling message 17 is sent in a step 62 to a receiver processing node, possibly via other network nodes to be involved in the transportation of the flow(s).

Assuming that the signaling message 17 that is sent in step 62 is a NSLP RESERVE message, this message will be processed by each NSIS aware node that it traverses. In a transport node only the indication of required transport resources will be processed. In this case of an NSLP RESERVE message it means that the transport node will process only the Local QSPEC 21. The transport node will reserve transport resources in accordance with the indication of required transport resources (provided that the required resources are available). Methods for reservation of transport resources are well known to the person skilled in the art and will therefore not be discussed in greater detail herein. When a processing node receives the signaling message 17, see step 71 of FIG. 7, it will interpret the indication of required processing resources in a step 72. In this case when the signaling message 17 is the NSLP RESERVE message it means that the processing node will process the Initiator QSPEC 22. The required processing resources are reserved in a step 75 provided that the required processing resources are available.

It is preferable that the sender node receives some kind of feedback that indicates whether or not the requested reservation of resources (transport and/or processing) was successful. Thus the receiver node 12 may be adapted to send a response message (illustrated by reference numeral 18 in FIG. 1) to the sender node 11, e.g. a RESPONSE message according to NSLP. In case successful reservation is indicated in the response message the traffic flow(s) 16 can be sent. In case of unsuccessful reservation it is preferable that the response message 18 indicates whether the reservation of transport resources, the reservation of processing resources or both were unsuccessful. In case NSLP is used as described above, this can be achieved by setting a corresponding error flag in the Local QSPEC if the transport resource reservation was unsuccessful, and by setting an error flag in the Initiator QSPEC if the processing resource reservation was unsuccessful. The QSPEC object is sent back to the sender node 11 in the RESPONSE message 18. In this way the sender node will be notified if the reason of reservation failure is transport or processing resource problems and it can take an appropriate action. Either it may not sent the planned traffic flow(s) at all, or tries to reserve smaller amounts of resources and reduce the volume, processing need of the flow(s), or sends an alarm message to a management node.

There are several options for how the reservation of processing resources may be carried out. Some options according to different embodiments of the invention will now be discussed with reference to FIG. 7. The processing reservation is related the actual load of the processors of the processing nodes. After interpreting the indication of required processing resources in step 72, the processing node may check, in a step 74, if the required processing resources are available. This check may include summing all current processing resource reservations in the node and the required processing resources as indicated in the signaling message 17. If the sum is below a predetermined threshold value for available processing resources within the node the required processing resources may be reserved in step 75 and a message that the reservation was successful can be sent in a step 76 to the sender node. The traffic flow may then be received and processed in the receiver node in a step 77. If the sum is above the predetermined threshold value for available processing resources the new reservation is unsuccessful and a message that the reservation failed may be sent in a step 78 to the sender node. The predetermined threshold value for available processing resources may be the maximum processing capacity of the node or a lower level in case it is not desirable to allow the processing node to make reservations up to its maximum processing capacity.

Since the indication of required processing resources often would be a requested processing time, step 74 could involve summing the current requests for processing time (i.e. including pending reservations and new requests and excluding any expired reservation) for a time period. If the resulting sum of total requested processing time is smaller than the time period then the processing node is able to process all requests including a new request, therefore, the new reservation will be successful. Otherwise the new reservation is unsuccessful.

When the traffic flow is processed in step 77, a policing function may monitor whether the flow is processed within the reserved time or not. If the processing takes more time than the reserved time, the flow may be discarded, or a notification message may be sent to the sender node. The sender node may then take this notification into account in a subsequent reservation message by reserving more time for a subsequent flow.

Reservations of both processing resources and transport resources should preferably follow the resource management process described in QoS NSLP. The reservations of resources are removed after they expire but they can be torn down earlier explicitly if it is needed.

As mentioned above an optional feature according to an embodiment of the invention is to allow for the indication of required processing resources in the signaling message 17 to include an indication that the required amount of processing resources should be measured in a processing node e.g. by indicating that the required processing resources are unknown. If this optional feature is implemented the processing node may be adapted to perform the optional steps 73 and 79-84 as shown in FIG. 7. If the indication of required processing resources indicates that the amount of required processing resources is unknown in step 73, the processing node may check if the processing load (i.e. the load in relevant processor(s) in the node) is below a predetermined limit in step 79. If the load is below the limit the traffic flow may be admitted and a reservation successful message sent to the sender node in step 81. The traffic flow is received and processed in step 82 and the required processing resources (normally processing time) for processing the traffic flow is measured in step 83. The measurement of the required processing resources is then sent to the sender node which may use this measurement to reserve an appropriate amount of processing resources for a subsequent traffic flow. If it is found in 79 that the processing load is above the predetermined limit the traffic flow is not admitted and a reservation failed message is sent to the sender node in step 80 Note that in step 81 the traffic flow is admitted without reserving any processing resources. It is therefore wise to choose the limit used in step 79 so that admittance of a traffic flow without reservation of processing resources is not likely to cause an overload in the processing node. An alternative to the method according to step 79-84 is to always admit traffic flows for which the amount of required processing resources is unknown, but at a greater risk for overload in the processing node.

A number of different application scenarios will now be described in which it may be particularly interesting to implement embodiments of the present invention since they demand large amounts of processing capacity.

Figure 3:
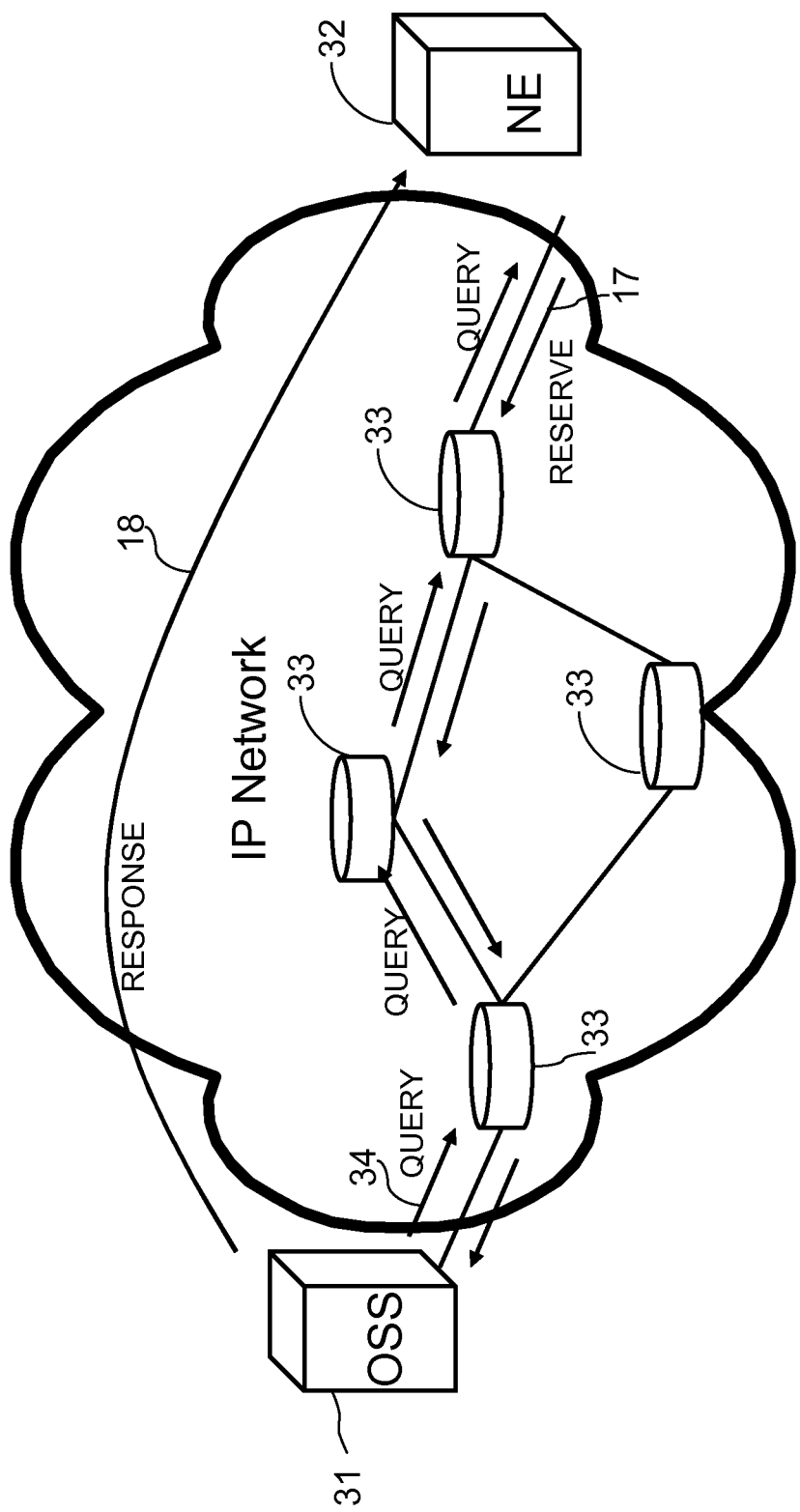
FIG. 3 is a schematic block diagram illustrating a first application scenario of embodiments of the present invention in connection with a Performance Management.

A first application scenario is illustrated in FIG. 3 and relates to a performance management (PM) function in an Operation Support System (OSS). In WCDMA and LTE RAN systems an OSS node 31 sends and receives messages from network elements 32 (only one NE 32 shown in FIG. 3 for simplicity), such as Node Bs and RNCs (Radio Network Controllers), associated with different management functions of OSS. Especially performance management function requires strong processing and transport requirements. In Node Bs and RNCs several basic operation events are recorded and collected in performance management counters. The counters, or statistical data of counters, are retrieved periodically by OSS. The PM file transfer should be fast enough and should be finished well before the retrieving period ends; otherwise it influences the data of the next period. The required bandwidth for the OAM traffic is usually estimated during the network dimensioning assuming a traffic model; however it does not provide a guarantee of file transfer. Many times the OAM and user traffic is not separated in the transport layer and fluctuation of the user data or higher user data may influence the OAM operation. Furthermore the processing of PM data in the OSS node 31 (or any other network intelligence node devoted to processing the PM data) requires substantial processing resources, which is due to the large number of counters and the large number of managed network elements (10-20000 cells in a RAN). The processing may start in parallel with the file transfer, or it can start when the transfer is finished. For the processing time, the same is valid as for the file transport: it should be finished before the next processing period starts. If a PM operation fails, it has been difficult or not possible to distinguish if it is a transport or processing problem. Thus it is beneficial to implement an embodiment of the present invention to reserve transport resources in transport nodes 33 and processing capacity in the NEs 32 and OSS node 31 for each PM session. The goal of applying combined processing and transport resource reservation for PM operation is to guarantee the PM operation service. If the service cannot be guaranteed the OSS is notified before the given PM file is sent.

The embodiment described below for a PM function uses NSIS QoS NSLP signaling as described above although embodiments using other types of protocols are foreseen. A suitable way to reserve resources for OSS PM operation is to make an NSIS receiver oriented reservation with the new QoS model described above. In this signaling scheme, the OSS node 31 sends a QUERY message 34 to the network element (NE) 32, which is typically a Node B or RNC, from which PM files should be retrieved. In response, the NE 32 sends a RESERVE message 17 that should include the nested QSpec processing and transport reservation objects (Local QSPEC and Initiator QSPEC). In each transport node 33 (router) transport resources are reserved in accordance with the Local QSPEC. The Initiator QSPEC preferably contains the type of the PM files and the number of counters per counter types. The processing time in the OSS node 31 depends on PM type, and with good approximation it is a linear function of the number of counters. It is possible, therefore, to measure the required processing time for each type of PM file and counter types. When receiving the QSPEC object, the OSS node 31 estimates the required processing time for the given PM file based on QSPEC parameter values and corresponding pre-measured coefficients. Alternatively measured coefficients describing the required processing time may be available in the NE and the NE may be able to estimate the required processing time. In this case the NE indicates explicitly the required processing time in the Initiator QSPEC object. Another alternative or complementary implementation to the previous ones is that the NE indicates that the processing time of a given PM file is unknown. In this case the OSS node 31 may perform the steps 79-84 shown in FIG. 7. If the PM data flow is admitted and processed, the processing time may be measured. This processing time can be reported to the NE and used when the next similar reservation request is to be sent from the same NE. The required processing resources as indicated in the Initiator QSPEC are reserved in the OSS node for processing the given PM file provided that these resources are available. If the reservation of transport and processing resources is successful in each node, the OSS node sends back a RESPONSE message 18 to the NE 32 (using reliable transport) that indicate successful reservation. After that the PM file can be sent to the OSS node 31. In normal operating conditions the OSS node receives several reservations per seconds.

Figure 4:
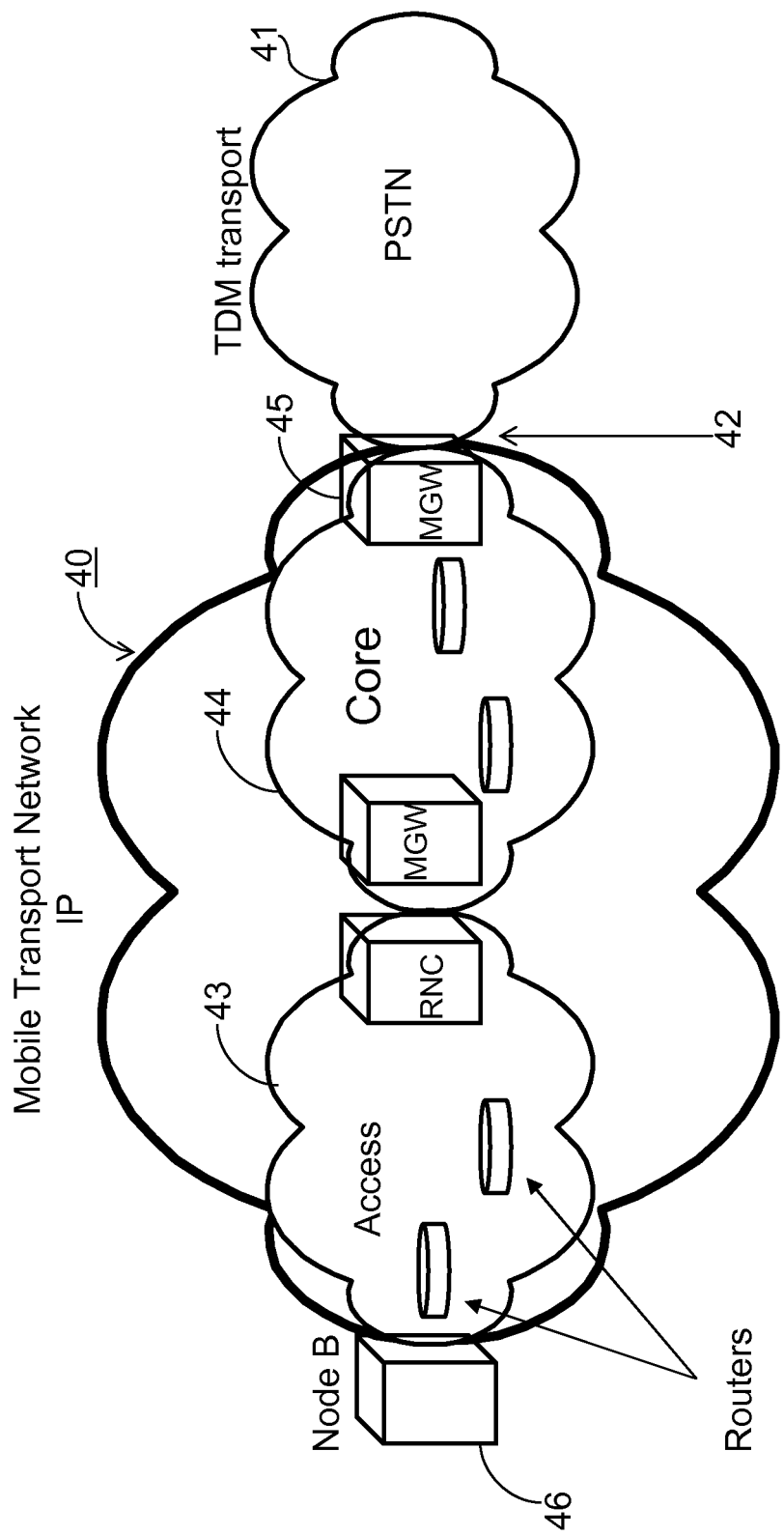
FIG. 4 is a schematic block diagram illustrating a second application scenario of embodiments of the present invention in connection with transcoding of a media session.

A second application scenario is illustrated in FIG. 4 and relates to providing guaranteed service for media sessions in heterogeneous transport network. The embodiment of the present invention described for the second application scenario uses NSIS QoS NSLP signaling as described above although embodiments using other types of protocols are foreseen. In heterogeneous transport networks different transport protocols are used in different parts of the network. Different network types may require different coding. Therefore media streams are transcoded at Media Gateway (MGW) node 45. In the scenario illustrated in FIG. 4 a 3G network 40 is connected to a traditional Public Service Telephony Network (PSTN) 41. In the 3G part 40 IP transport is used and voice is AMR (Adaptive Multi-Rate) coded. In the PSTN network 41 TDM (Time division multiplexing) transport and PCM (pulse-code modulation) voice coding is used. At the network edge 42, the MGW transcodes the voice traffic. In the 3G network 40, both in an access part 43 and a core part 44, IP transport reservation is made with the NSIS protocol Local QSPEC according to this embodiment of the present invention. Using the same signaling messages, processing reservation is made for transcoding voice traffic in the MGW 45 using the Initiator QSPEC. In the MGW the maximum transcoding capacity depends on the used processors but it also depends on the actual traffic mix. In the MGW 45 the actual processing capacity that is requested (including current reservations and new requests) is compared with the maximum processing capacity (or a lower predetermined threshold value) and a new request is successful only if there is enough free capacity for the new session as well. Criteria of successful session setup are that both transport and processing resources could be reserved. If the session originated in the 3G network 40, a Node B 46 initiates an NSIS RESERVE message, including the Local QSPEC for transport reservation and the Initiator QSPEC for processing reservation. In each transport node transport reservations are made based on the Local QSPEC. In the MGW processing reservation is made for the transcoding based on the Initiator QSPEC. The Initiator QSPEC may indicate the bitrate and the coding types. The required processing time is assumed to be a linear function of the bitrate. Coefficients can be determined/measured for each transcoding type (i.e. transcoding from PCM to AMR etc.). Based on these values the processing time can be calculated by a linear formula. The reservation of processing resources is made for the indicated bitrate and coding types and this reservation may be maintained by refresh RESERVE messages. This means that the reservation is active until it expires or is explicitly torn down in accordance with a feature of NSIS.

Figure 5:
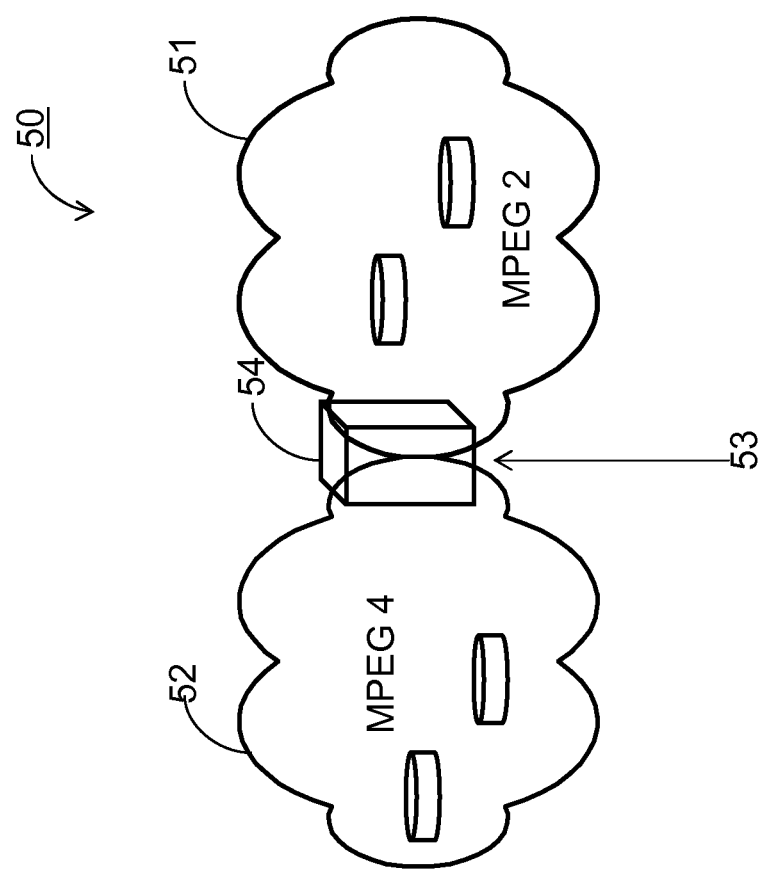
FIG. 5 is a schematic block diagram illustrating a third application scenario of embodiments of the present invention in connection with transcoding of a TV service.

A third application scenario is illustrated in FIG. 5. This scenario is also related to transcoding. The embodiment of the present invention described for the third application scenario uses NSIS QoS NSLP signaling as described above although embodiments using other types of protocols are foreseen. An on demand TV service is offered in a network 50 of an Internet provider, which uses IP/Ethernet for transport. The TV service is available in MPEG4 coding in a core part of the network 52 but the service provider use MPEG2 in an access part 51 of the network. Media streams of the TV service need to be transcoded at the edge 53 of the two networks 51, 52. Before setting up a new media stream, transporting resources and processing resources are reserved using NSIS signaling. Similarly to the previous application scenario, transport reservation is made in routers based on the Local QSPEC, while processing reservation is made based on the Initiator QSPEC in an edge node transcoder 54 for MPEG4/MPEG2 transcoding.

In the three application scenarios discussed above both transport and processing resources could be reserved to improve the QoS control. A signaling mechanism based on NSIS was used to reserve transport and processing capacities together by the same signaling message. Thus strong QoS guarantees can be provided for the applications that include guarantees not only for transport but also processing of the application. The NSIS signaling mechanism can give feedback about the success of the reservation and in case of insufficient processing resources appropriate action can be taken.

Implementation of the above described methods of combining reservation of transport and processing resources will require some adaptation in network nodes. The sender node will have to be adapted to create the signaling message 17 that include both the indication of the amount of required transport resources and the indication of the amount of required processing resources. In FIG. 1 it is illustrated that the sender node 11 includes a processing unit 111 that is adapted for this purpose. The sender node 11 is also illustrated to comprise an output unit 112 that is adapted to send the signaling message 17. Processing nodes should be adapted to interpret the indication of required processing resources in the signaling message 17 and to be able to reserve processing resources in accordance with this indication. The receiver node 12 of FIG. 1 is illustrated to include a reservation unit 122 that is adapted for these tasks. However not that in case processing is to take place in the combined transport and processing node 14 then this node will also have to be provided with a reservation unit 122 (not shown in FIG. 1). According to different embodiments the reservation unit 122 may also be adapted to perform operations related to investigating if enough processing resources are available for accepting a new reservation request and for triggering a measurement of the amount of processing resources required for processing a traffic flow. The receiver node 12 is also illustrated to include an input unit 121 adapted to receive the signaling message 17. The receiver node may also include an output unit 124 that is adapted to send a response message to indicate whether or not a resource reservation was successful. The above described units of the sender node and receiver node may be implemented as separate units or as integrated units in different combinations. It is possible to implement embodiments of the present invention in existing network nodes with some adaptations. Such adaptations will usually only require software adaptations, although implementations that that include adaptations in firmware, hardware or combinations thereof are also feasible.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a first node of a telecommunications network for dynamic reservation of resources for at least one traffic flow, said method comprising creating at least one signaling message including resource reservation information related to the at least one traffic flow, said resource reservation information including an indication of the amount of transport resources required for transportation of the at least one traffic flow within the telecommunications network and an indication of the amount of processing resources required for processing traffic payload of the at least one traffic flow to enable resource reservation of traffic resources and processing resources for the at least one traffic flow and sending the at least one signaling message to at least one second node, wherein said signaling message is a NSIS signaling layer protocol, NSLP, message, the indication of the amount of required transport resources is included in Local QSPEC of the NSLP message and the indication of the amount of required processing resources is included in Initiator QSPEC of the NSLP message.

2. The method according to claim 1, wherein said telecommunications network is an Internet Protocol, IP, network.

3. The method according to claim 1, wherein the indication of the amount of required processing resources includes a parameter describing the processing time required for processing the traffic payload.

4. The method according to claim 1, wherein the indication of the amount of required processing resources includes a parameter describing the type of traffic payload to implicitly indicate the required processing resources.

5. The method according to claim 1, wherein the indication of the amount of required processing resources includes an indication that the required processing resources should be measured in a processing node.

6. The method according to claim 1, wherein said at least one traffic flow is traffic arising from a performance management, PM, function in an Operation Support System, OSS, of the telecommunications network and wherein the indication of the amount of required processing resources indicates resources required for processing PM data.

7. The method according to claim 1, wherein said at least one traffic flow includes payload that needs to be transcoded in the telecommunications network and wherein the indication of the amount of required processing resources indicates resources required for transcoding the payload.

8. A method in a node of a telecommunications network for dynamic reservation of resources for at least one traffic flow, said method comprising
receiving at least one signaling message including a resource reservation request related to the at least one traffic flow, said resource reservation request including an indication of the amount of transport resources required for transportation of the at least one traffic flow within the telecommunications network and an indication of the amount of processing resources required for processing traffic payload of the at least one traffic flow;
reserving resources in accordance with the received request if such resources are available; and
interpreting the indication of the amount of required processing resources and reserving the required processing resources if such resources are available,
wherein said signaling message is a NSIS signaling layer protocol, NSLP, message, the indication of the amount of required transport resources is included in Local QSPEC of the NSLP message and the indication of the amount of required processing resources is included in Initiator QSPEC of the NSLP message and wherein interpreting the indication of the amount of required processing resources comprises interpreting information in the Initiator QSPEC.

9. The method according to claim 8, wherein said telecommunications network is an Internet Protocol, IP, network.

10. The method according to claim 8 further comprising summing current processing resource reservations within the node and the required processing resources indicated in the at least one signaling message, comparing the sum to a predetermined threshold value for available processing resources within the node, and reserving the required processing resources if the sum is below the predetermined threshold value.

11. The method according to claim 8 further comprising sending a response message of the resource reservation request, which response message includes an indication that the reservation of processing resources was successful if the required processing resources were reserved and an indication that the reservation of processing resources failed if the required processing resources were not reserved.

12. The method according to claim 8, wherein interpreting the indication of the amount of required processing resources includes reading a parameter describing the processing time required for processing the traffic payload, or computing the processing time required for processing the traffic payload using a parameter describing the type of traffic payload that implicitly indicate the required processing resources.

13. The method according to claim 8 further comprising measuring the processing resources required within the node for processing the traffic payload if the indication of the amount of required processing resources includes an indication that the required processing resources are unknown.

14. The method according to claim 13 further comprising sending the result of the measurement to the sender of the resource reservation request for use in a future corresponding resource reservation request.

15. The method according to claim 8, wherein said at least one traffic flow is traffic arising from a performance management, PM, function in an Operation Support System, OSS, of the telecommunications network and wherein the said reserving involves reserving resources within the node for processing PM data.

16. The method according to claim 8, wherein said at least one traffic flow includes payload that needs to be transcoded in the telecommunications network and wherein said reserving involves reserving resources within the node for transcoding the payload.

17. A first network node for use in a telecommunications network and adapted for dynamic reservation of resources for at least one traffic flow, said first network node comprising
a processing unit adapted to create at least one signaling message including resource reservation information related to the at least one traffic flow, said resource reservation information including an indication of the amount of transport resources required for transportation of the at least one traffic flow within the telecommunications network and an indication of the amount of processing resources required for processing traffic payload of the at least one traffic flow to enable resource reservation of traffic resources and processing resources for the at least one traffic flow; and
an output unit adapted to send the at least one signaling message to at least one second network node,
wherein said signaling message is a NSIS signaling layer protocol, NSLP, message, and wherein the processing unit is adapted to include the indication of the amount of required transport resources in Local QSPEC of the NSLP message and to include the indication of the amount of required processing resources in Initiator QSPEC of the NSLP message.

18. The first network node according to claim 17, wherein the indication of the amount of required processing resources includes an indication that the required processing resources should be measured in a processing node.

19. A network node for use in a telecommunications network and adapted for dynamic reservation of resources for at least one traffic flow, said network node comprising
an input unit adapted to receive at least one signaling message including a resource reservation request related to the at least one traffic flow,
reservable processing resources adapted to process traffic payload of the at least one traffic flow; and
a reservation unit adapted to
interpret said resource reservation request, wherein the resource reservation request includes an indication of the amount of transport resources required for transportation of the at least one traffic flow within the telecommunications network and an indication of the amount of processing resources required for processing traffic payload of the at least one traffic flow, and to
reserve resources in accordance with the received request if such resources are available,
wherein said signaling message is a NSIS signaling layer protocol, NSLP, message, the indication of the amount of required transport resources is included in Local QSPEC of the NSLP message and the indication of the amount of required processing resources is included in Initiator QSPEC of the NSLP message and wherein said reservation unit is adapted to read the Initiator QSPEC to interpret the indication of the amount of required processing resources.

20. The network node according to claim 19, wherein said reservation unit is adapted to
sum current processing resource reservations within the network node and the required processing resources indicated in the at least one signaling message,
compare the sum to a predetermined threshold value for available processing resources within the node, and
reserve the required processing resources if the sum is below the predetermined threshold value.

21. The network node according to claim 19, wherein said network node further comprises an output unit adapted to send a response message to the sender of the resource reservation request, which response message includes an indication that the reservation of processing resources was successful if the required processing resources were reserved and an indication that the reservation of processing resources failed if the required processing resources were not reserved.

22. The network node according to claim 19, wherein said reservation unit is adapted to trigger a measurement of the processing resources required within the network node for processing the traffic payload if the indication of the amount of required processing resources includes an indication that the required processing resources are unknown.

23. The network node according to claim 19, wherein said network node is an Operation Support System, OSS, node, wherein said at least one traffic flow is traffic arising from a performance management, PM, function in the Operation Support System, OSS, of the telecommunications network and wherein the reservation unit is adapted to reserve resources within the network node for processing PM data.

24. The network node according to claim 19, wherein said at least one traffic flow includes payload that needs to be transcoded in the telecommunications network and wherein said reservable processing resources includes resources for transcoding the payload.

* * * * *

UNITED STATES PATENT AND TRADEMARK OFFICE
CERTIFICATE OF CORRECTION

| | | |
|---|---|---|
| PATENT NO. | : 8,605,594 B2 | Page 1 of 1 |
| APPLICATION NO. | : 13/320791 | |
| DATED | : December 10, 2013 | |
| INVENTOR(S) | : Bader | |

It is certified that error appears in the above-identified patent and that said Letters Patent is hereby corrected as shown below:

In the Claims:

In Column 13, Line 60, in Claim 11, delete "message" and insert -- message to the sender --, therefor.

Signed and Sealed this
Twenty-second Day of July, 2014

Michelle K. Lee
*Deputy Director of the United States Patent and Trademark Office*